US008258202B2

(12) United States Patent
Chasser et al.

(10) Patent No.: US 8,258,202 B2
(45) Date of Patent: Sep. 4, 2012

(54) ANTIMICROBIAL COATING COMPOSITIONS, RELATED COATINGS AND COATED SUBSTRATES

(75) Inventors: Anthony M. Chasser, Allison Park, PA (US); Lawrence J. Fitzgerald, Gibsonia, PA (US); Venkateshwarlu Kalsani, Allison Park, PA (US); Jennifer L. Thomas, Pittsburgh, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 586 days.

(21) Appl. No.: 12/370,161

(22) Filed: Feb. 12, 2009

(65) Prior Publication Data

US 2010/0204357 A1    Aug. 12, 2010

(51) Int. Cl.
  *C08K 3/10* (2006.01)
  *C08K 3/22* (2006.01)
  *A61K 9/70* (2006.01)

(52) U.S. Cl. ............... 523/122; 424/65; 424/66; 424/67; 424/68; 424/69; 424/443; 524/403; 524/413

(58) Field of Classification Search ............... 523/122; 524/403, 413; 424/65, 66, 67, 68, 69, 443
See application file for complete search history.

(56) References Cited

U.S. PATENT DOCUMENTS

| | | | |
|---|---|---|---|
| 2,941,966 | A | 6/1960 | Campbell |
| 4,061,499 | A | 12/1977 | Himmelmann |
| 4,923,619 | A | 5/1990 | Legros |
| 4,938,955 | A | 7/1990 | Niira |
| 4,938,958 | A | 7/1990 | Niira |
| 5,405,644 | A | 4/1995 | Ohsumi |
| 5,698,229 | A | 12/1997 | Ohsumi |
| 5,856,014 | A | 1/1999 | Imashiro |
| 6,013,275 | A * | 1/2000 | Konagaya et al. ............ 424/443 |
| 6,267,590 | B1 | 7/2001 | Barry |
| 6,436,422 | B1 | 8/2002 | Trogolo |
| 6,468,521 | B1 | 10/2002 | Pedersen |
| 7,098,256 | B2 | 8/2006 | Ong |
| 7,125,570 | B2 | 10/2006 | Taniguchi |
| 7,151,139 | B2 | 12/2006 | Tiller |
| 7,258,921 | B2 | 8/2007 | Hashiba |
| 7,339,015 | B2 | 3/2008 | Wynne |
| 2004/0156918 | A1 | 8/2004 | Podhajny |
| 2005/0287353 | A1 | 12/2005 | Trogolo |
| 2006/0024264 | A1 | 2/2006 | Kuroda |
| 2006/0156948 | A1 | 7/2006 | Hendriks |
| 2007/0218095 | A1 | 9/2007 | Anderson |
| 2007/0292486 | A1 | 12/2007 | Sen |

FOREIGN PATENT DOCUMENTS

| | | |
|---|---|---|
| WO | 95/34327 | 12/1995 |
| WO | 2006/020312 | 2/2006 |
| WO | 2007/014087 | 2/2007 |
| WO | 2007/070649 | 6/2007 |
| WO | 2008/033364 | 3/2008 |

OTHER PUBLICATIONS

Haldar, Jayanta et al., "Polymeric coatings that inactivate both influenza virus and pathogenic bacteria", Proceedings of the National Academy of Sciences, Nov. 21, 2006; pp. 17667-17671, vol. 103, No. 47, Melville, New York 11747-4502, USA.

Haldar, Jayanta et al., "Preparation, application and testing of permanent antibacterial and antiviral coatings", Nature Protocols, Sep. 27, 2007; pp. 2412-2417, vol. 2, No. 10, Nature Publishing Group, A Subsidiary of Macmillan Ltd., 175 Fifth Avenue, New York, New York 10010.

Ishitsuka, Yuji et al., "Amphiphillic Poly(phenyleneethynylene)s Can Mimic Antimicrobial Peptide Membrane Disordering Effect by Membrane Insertion", Journal of the American Chemical Society, Mar. 1, 2006; pp. 13123-13129, vol. 128, American Chemical Society, 1155 Sixteenth Street N.W., Washington, D.C. 20036.

Ivanov, Ivaylo et al., "Characterization of Nonbiological Antimicrobial Polymers in Aqueous Solution and at Water-Lipid Interfaces from All-Atom Molecular Dynamics", Journal of the American Chemical Society, Sep. 20, 2005; pp. 1778-1779, vol. 128, American Chemical Society, 1155 Sixteenth Street N.W., Washington, D.C. 20036.

Kuroda, Kenichi et al., "Amphiphillic Polymethacrylate Derivatives as Antimicrobial Agents", Journal of the American Chemical Society, Sep. 23, 2004; pp. 4128-4129, vol. 127, American Chemical Society, 1155 Sixteenth Street N.W., Washington, D.C. 20036.

Kurt, Pinar et al., "Highly Effective Contact Antimicrobial Surfaces via Polymer Surface Modifiers", Langmuir, Feb. 14, 2007; pp. 4719-4723, vol. 23, American Chemical Society, 1155 Sixteenth Street N.W., Washington, D.C. 20036.

Lee, Sang Beom et al., "Self-Assembly of Biocidal Nanotubes from a Single-Chain Diacetylene Amine Salt", Journal of the American Chemical Society, Mar. 17, 2004; pp. 13400-13405, vol. 126, American Chemical Society, 1155 Sixteenth Street N.W., Washington, D.C. 20036.

Mowery, Brendan P. et al., "Mimicry of Antimicrobial Host-Defense Peptides by Random Copolymers", Journal of the American Chemical Society, Sep. 20, 2007; pp. 15474-15476, vol. 129, American Chemical Society, 1155 Sixteenth Street N.W., Washington, D.C. 20036.

Sambhy, Varun et al., "Silver Bromide Nanoparticle/Polymer Composites: Dual Action Tunable Antimicrobial Materials", Journal of the American Chemical Society, Mar. 1, 2006; pp. 9798-9808, vol. 128, American Chemical Society, 1155 Sixteenth Street N.W., Washington, D.C. 20036.

Tew, Gregory N. et al., "De novo design of biomimetic antimicrobial polymers", Proceedings of the National Academy of Sciences, Apr. 16, 2002; pp. 5110-5114, vol. 99, No. 8, Melville, New York 11747-4502, USA.

Zhang, Wen-Xiong, "Catalytic addition of alkyne C-H, amine N-H, and phosphone P-H bonds to carbodiimides: an efficient route to propiolamidines, guanidines, and phosphaguanidines", Organic & Biomolecular Chemistry, Jan. 4, 2008; pp. 1-22, Royal Society of Chemistry, Cambridge, Thomas Graham House (290), Science Park, Milton Road, Cambridge CB4 0WF, United Kingdom.

* cited by examiner

*Primary Examiner* — Ana Woodward
(74) *Attorney, Agent, or Firm* — Donald R. Palladino

(57) ABSTRACT

Disclosed are antimicrobial coating compositions. These coating compositions comprise (a) a film-forming resin; (b) a porous solid comprising pores having anti-microbial metal ions disposed therein; and (c) an onium compound.

11 Claims, No Drawings

ANTIMICROBIAL COATING COMPOSITIONS, RELATED COATINGS AND COATED SUBSTRATES

STATEMENT REGARDING FEDERALLY SPONSORED RESEARCH

This invention was made with Government support under Contract No. 1935-42000-051-01S awarded by the United States Department of Agriculture. The United States Government may have certain rights in this invention.

CROSS-REFERENCE TO RELATED APPLICATIONS

This application is related to (i) U.S. patent application Ser. No. 12/370.100, entitled, "Polycarbodiimides Having Onium Salt Groups", filed concurrently herewith; and (ii) U.S. patent application Ser. No. 12/370,123, entitled "Coating Compositions That Include Onium Salt Group Containing Polycarbodiimides", also filed concurrently herewith.

FIELD OF THE INVENTION

The present invention relates to antimicrobial coating compositions.

BACKGROUND INFORMATION

Various organic and inorganic materials have been proposed for incorporation into coatings in order to impart antimicrobial properties. Inorganic, "naturally occurring", antimicrobial agents are often desired as a "green" alternative to synthetically produced organic antimicrobial agents. These materials often employ metals, especially silver, zinc, gold, and/or copper, which are believed to have relatively low environmental and toxicological effects and high antimicrobial activity. Antimicrobial agents that incorporate ionic forms of these metals, often through an ion-exchange type mechanism, are sometimes used. Exemplary ion-exchange type antimicrobial agents include those wherein the ion-exchange carrier particles are ceramic particles, such as zeolites.

A problem associated with inorganic ion-exchange type antimicrobial agents, however, is their tendency to cause discoloration of the composition into which they are incorporated, particularly when silver ions are used. This discoloration may arise from, it is believed, an interaction of silver ions on the surface of the carrier particles and/or exchanging out of the carrier particles with other compounds or ions present in the composition into which the antimicrobial agent is incorporated. Such discoloration can be particularly problematic in coatings applications where decorative properties are often critical.

As a result, efforts have been made to reduce the discoloration of coatings that use inorganic ion-exchange type antimicrobial agents. For example, partial replacement of the ion-exchangeable ions in a zeolite with ammonium has been taught to reduce discoloration. However, as described in U.S. Pat. No. 4,938,955 ("the '955 patent") and U.S. Pat. No. 6,436,422 ("the '422 patent"), it is often necessary to further add certain organic discoloration inhibitors in addition to the ammonium ion containing zeolite in order to adequately prevent discoloration of the resin in which the zeolite is incorporated. As described in the '422 patent, however, the addition of the organic discoloration inhibitors described in the '955 patent can be problematic.

It would be desirable to provide antimicrobial compositions that employ ion-exchange type inorganic antimicrobial agents, but that do not exhibit the degree of discoloration historically associated with coatings incorporating such antimicrobial agents and which do not require the use of the organic the discoloration inhibitors described in the '955 patent to achieve such discoloration inhibition, while not significantly impacting the antimicrobial efficacy of the ion-exchange type inorganic agents.

SUMMARY OF THE INVENTION

In certain respects, the present invention is directed to antimicrobial coating compositions. These coating compositions comprise: (a) a film-forming resin; (b) a porous solid comprising pores having anti-microbial metal ions disposed therein; and (c) a halogen ion-containing onium compound having a minimum molecular diameter greater than the size of the pores having anti-microbial metal ions disposed therein. Moreover, in these coating compositions, the porous solid (b) and halogen ion-containing onium compound (c) are present in amounts such that the composition, when applied onto a substrate and cured, provides a cured coating that exhibits UV color stability comparable to the UV color stability exhibited by the same composition that does not include (b) and (c).

In other respects, the present invention is directed to antimicrobial coating compositions that comprise: (a) a film-forming resin; (b) a porous solid comprising pores having anti-microbial metal ions disposed therein; and (c) a halogen ion-containing onium compound having a minimum molecular diameter greater than the size of the pores having anti-microbial metal ions disposed therein. In these coating compositions, the porous solid (b) and halogen ion-containing onium compound (c) are present in amounts such that the molar ratio of halogen atoms in the halogen ion-containing onium compound to metal-containing ions in the coating composition is at least 1:1.

In yet other respects, the present invention is directed to antimicrobial coating compositions that comprise: (a) a film-forming resin comprising functional groups reactive with carbodiimide groups; (b) a porous solid comprising pores having anti-microbial metal ions disposed therein; and (c) a polycarbodiimide comprising pendant and/or terminal onium salt groups.

The present invention is also directed to, inter alia, related coated substrates and methods for coating a substrate.

DETAILED DESCRIPTION OF THE INVENTION

For purposes of the following detailed description, it is to be understood that the invention may assume various alternative variations and step sequences, except where expressly specified to the contrary. Moreover, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to antimicrobial coating compositions. As used herein, the term "antimicrobial coating composition" refers to a coating composition capable of producing a coating that has the ability to effect a significant, such as at least a 90% reduction (1-log order reduction), in the population of bacteria and other microbes in contact with the coating, and thereby control the growth of microorganisms. The control of the growth of microorganisms may also be referred to as antimicrobial activity. Also, in certain embodiments, the antimicrobial compositions of the invention can provide a coating that causes greater than a 99% reduction (2-log order reduction), such as greater than a 99.99% reduction (4-log order reduction), or, in some cases, greater than a 99.999% reduction (5-log order reduction) in the microbial population in contact with the coating.

The coating compositions of the present invention comprise a film-forming resin. As used herein, the term "film-forming resin" refers to resins that can form a self-supporting continuous film on at least a horizontal surface of a substrate upon removal of any diluents or carriers present in the composition or upon curing at ambient or elevated temperature.

Film-forming resins that may be used in the coating compositions of the present invention include, without limitation, those used in automotive OEM coating compositions, automotive refinish coating compositions, industrial coating compositions, architectural coating compositions, coil coating compositions, protective and marine coating compositions, and aerospace coating compositions, among others.

In certain embodiments, the film-forming resin included within the coating compositions of the present invention comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating compositions of the present invention comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

Film-forming resins suitable for use in the coating compositions of the present invention include, for example, those formed from the reaction of a polymer having at least one type of reactive group and a curing agent having reactive groups reactive with the reactive group(s) of the polymer. As used herein, the term "polymer" (and like terms, such as "polymeric") is meant to encompass oligomers, and includes, without limitation, both homopolymers and copolymers; the prefix "poly" referring to two or more. The polymers can be, for example, acrylic, saturated or unsaturated polyester, polyurethane or polyether, polyvinyl, cellulosic, acrylate, silicon-based polymers, co-polymers thereof, and mixtures thereof, and can contain reactive groups such as epoxy, carboxylic acid, hydroxyl, isocyanate, amide, carbamate and carboxylate groups, among others, including mixtures thereof.

Suitable acrylic polymers include, for example, those described in United States Patent Application Publication 2003/0158316 A1 at [0030]-[0039], the cited portion of which being incorporated herein by reference. Suitable polyester polymers include, for example, those described in United States Patent Application Publication 2003/0158316 A1 at [0040]-[0046], the cited portion of which being incorporated herein by reference. Suitable polyurethane polymers include, for example, those described in United States Patent Application Publication 2003/0158316 A1 at [0047]-[0052], the cited portion of which being incorporated herein by reference. Suitable silicon-based polymers are defined in U.S. Pat. No. 6,623,791 at col. 9, lines 5-10, the cited portion of which being incorporated herein by reference.

In certain embodiments, particularly (but not exclusively) those embodiments in which a polycarbodiimide is employed as described herein, the coating composition comprises a film-forming resin comprising carboxylic acid functional groups. In these embodiments, the carboxyl-containing resin is not particularly restricted but may be, for example, a carboxyl-containing polyester resin, acrylic resin and/or polyurethane resin.

Suitable carboxyl-containing polyester resins can be prepared by condensation in the conventional manner, such as from an alcohol component and an acid component. The polyester resin so referred to herein includes the so-called alkyd resins as well.

As to the alcohol component, there may be specifically mentioned those having two or more hydroxy groups within each molecule, such as triols such as trimethylolpropane and hexanetriol, and diols such as propylene glycol, neopentyl glycol, butylene glycol, hexylene glycol, octylene glycol, 1,6-hexanediol, 1,8-octanediol, 1,9-nonanediol, 1,10-decanediol, 1,12-dodecanediol, 1,2-cyclohexanediol, 1,3-cyclohexanediol, 1,4-cyclohexanediol, hydrogenated bisphenol A, caprolactone diol and bishydroxyethyltaurine. The alcohol component may comprise two or more species.

The acid component includes, for example, those having two or more carboxyl groups within each molecule, for example aromatic dicarboxylic acids such as phthalic acid and isophthalic acid, aliphatic dicarboxylic acids such as adipic acid, azelaic acid and tetrahydrophthalic acid, and tricarboxylic acids such as trimellitic acid. Furthermore, mention may be made of long-chain fatty acids such as stearic acid, lauric acid and the like, oleic acid, myristic acid and like unsaturated ones, natural fats or oils such as castor oil, palm oil and soybean oil and modifications thereof. The above acid component may comprise two or more species.

Diacids and diols of fatty acids, such as EMPOL 1010 fatty diacid from the Cognis Emery Group, can be used or its corresponding diol can be used.

In cases where the polyester resin obtained has hydroxy groups, the whole or part thereof may be modified with an acid anhydride, such as phthalic anhydride, succinic anhydride, hexahydrophthalic anhydride or trimellitic anhydride, so that the resin may have carboxyl groups.

Suitable carboxyl-containing acrylic resins can be obtained in the conventional manner, specifically by solution or emulsion polymerization, of a carboxyl-containing ethylenically unsaturated monomer and another ethylenically unsaturated monomer.

Exemplary carboxyl-containing ethylenically unsaturated monomers include acrylic acid, methacrylic acid, ethacrylic acid, crotonic acid, maleic acid, fumaric acid, itaconic acid, half esters thereof such as maleic acid ethyl ester, fumaric acid ethyl ester and itaconic acid ethyl ester, succinic acid mono (meth) acryloyloxyethyl ester, phthalic acid mono (meth)acryloyloxyethyl ester and the like, including mixtures thereof.

Exemplary other ethylenically unsaturated monomer include hydroxy-containing ethylenically unsaturated monomers, such as 2-hydroxyethyl acrylate, 2-hydroxyethyl methacrylate, 4-hydroxybutyl acrylate, 4-hydroxybutyl methacrylate and products derived therefrom by reaction with lactones; amide-containing ethylenically unsaturated monomers, such as acrylamide, methacrylamide, N-isopropylacrylamide, N-butylacrylamide, N,N-dibutylacrylamide, hydroxymethylacrylamide, methoxymethylacrylamide and butoxymethylacrylamide and like (meth)acrylamides; and nonfunctional ethylenically unsaturated monomers, such as styrene, alpha-methylstyrene, acrylate esters (e.g. methyl acrylate, ethyl acrylate, butyl acrylate, 2-ethylhexyl acrylate) and methacrylate esters (e.g. methyl methacrylate, ethyl methacrylate, butylmethacrylate, isobutylmethacrylate, tert-butyl methacrylate, 2-ethylhexyl methacrylate, lauryl methacrylate), and so forth, including mixtures thereof.

For obtaining the desired resin by emulsion polymerization, specifically a carboxyl-containing ethylenically unsaturated monomer, another ethylenically unsaturated monomer, and an emulsifier are often subjected to polymerization in water. As specific examples of the carboxyl-containing ethylenically unsaturated monomer and of the other ethylenically unsaturated monomer, there may be mentioned those already mentioned hereinabove. The emulsifier is not particularly restricted but may be any of those well known to a skilled person in the art.

Suitable carboxyl-containing polyurethane resins can be produced, for example, by reacting a compound having an isocyanato group at both termini and a compound having two hydroxy groups and at least one carboxyl group.

The compound having an isocyanato group at both termini can be prepared, for example, by reacting a hydroxy-terminated polyol and a diisocyanate compound, as will be understood by those skilled in the art. The compound having two hydroxy groups and at least one carboxyl group is, for example, dimethylolacetic acid, dimethylolpropionic acid or dimethylolbutyric acid.

The coating compositions of the present invention may comprise two or more species of the carboxyl-containing resin.

The acid value carboxyl-containing resin is not particularly restricted but is often from 2 to 200, such as 2 to 30 or 20 to 200.

In certain embodiments, the coating compositions of the present invention can include a film-forming resin that is formed from the use of a curing agent. As used herein, the term "curing agent" refers to a material that promotes "cure" of composition components. As used herein, the term "cure" means that any crosslinkable components of the composition are at least partially crosslinked. In certain embodiments, the crosslink density of the crosslinkable components, i.e., the degree of crosslinking, ranges from 5 percent to 100 percent of complete crosslinking, such as 35 percent to 85 percent of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer, as is described in U.S. Pat. No. 6,803,408, at col. 7, line 66 to col. 8, line 18, the cited portion of which being incorporated herein by reference.

Any of a variety of curing agents known to those skilled in the art may be used. For example exemplary suitable aminoplast and phenoplast resins are described in U.S. Pat. No. 3,919,351 at col. 5, line 22 to col. 6, line 25, the cited portion of which being incorporated herein by reference. Exemplary suitable polyisocyanates and blocked isocyanates are described in U.S. Pat. No. 4,546,045 at col. 5, lines 16 to 38; and in U.S. Pat. No. 5,468,802 at col. 3, lines 48 to 60, the cited portions of which being incorporated herein by reference. Exemplary suitable anhydrides are described in U.S. Pat. No. 4,798,746 at col. 10, lines 16 to 50; and in U.S. Pat. No. 4,732,790 at col. 3, lines 41 to 57, the cited portions of which being incorporated herein by reference. Exemplary suitable polyepoxides are described in U.S. Pat. No. 4,681,811 at col. 5, lines 33 to 58, the cited portion of which being incorporated herein by reference. Exemplary suitable polyacids are described in U.S. Pat. No. 4,681,811 at col. 6, line 45 to col. 9, line 54, the cited portion of which being incorporated herein by reference. Exemplary suitable polyols are described in U.S. Pat. No. 4,046,729 at col. 7, line 52 to col. 8, line 9 and col. 8, line 29 to col. 9, line 66, and in U.S. Pat. No. 3,919,315 at col. 2, line 64 to col. 3, line 33, the cited portions of which being incorporated herein by reference. Exemplary suitable polyamines are described in U.S. Pat. No. 4,046,729 at col. 6, line 61 to col. 7, line 26, and in U.S. Pat. No. 3,799,854 at column 3, lines 13 to 50, the cited portions of which being incorporated herein by reference. Appropriate mixtures of curing agents, such as those described above, may be used.

In certain embodiments, the film-forming resin and other composition components are selected so as to provide a "tactile effect composition". As used herein, a "tactile effect composition" refers to a composition that, when applied to a substrate and cured, produces a coating exhibiting a desired feel, such as a soft texture or "soft feel". The coating compositions commercially available from PPG Industries, Pittsburgh, Pa. under the tradename VELVECRON are illustrative of such "tactile effect compositions".

In certain embodiments, the coating compositions of the present invention are formulated as a one-component composition where a curing agent is admixed with other composition components to form a storage stable composition. In other embodiments, compositions of the present invention can be formulated as a two-component composition where a curing agent is added to a pre-formed admixture of the other composition components just prior to application.

In certain embodiments, the film-forming resin is present in the coating compositions of the present invention in an amount greater than 30 weight percent, such as 40 to 90 weight percent, or, in some cases, 50 to 90 weight percent, with weight percent being based on the total weight of the coating composition. When a curing agent is used, it may, in certain embodiments, be present in an amount of up to 70 weight percent, such as 10 to 70 weight percent; this weight percent is also based on the total weight of the coating composition.

In certain embodiments, the coating compositions of the present invention are in the form of liquid coating compositions, examples of which include aqueous and solvent-based coating compositions and electrodepositable coating compositions. The coating compositions of the present invention may also be in the form of a co-reactable solid in particulate form, i.e., a powder coating composition. Regardless of the form, the coating compositions of the present invention may be pigmented or clear, and may be used alone or in combination as primers, basecoats, or topcoats.

In addition to the film-forming resin, the antimicrobial coating compositions of the present invention comprise a porous solid comprising pores having anti-microbial metal ions disposed therein. Suitable porous solids include, for example, silica gel, alumina, zeolite, zirconia, montmorillonite, and other ion-exchange ceramics. One example of such a porous solid is a zirconium phosphate-based ceramic ion-exchange resin containing silver, such as is available from Milliken & Company, Spartanburg, S.C., under the trademark AlphaSan®.

In certain embodiments, the porous solid comprises a zeolite comprising pores having anti-microbial metals ions disposed therein. In certain embodiments, such a zeolite is prepared by an ion-exchange reaction in which non-antimicrobial ions present in the zeolite, such as sodium ions, calcium ions, potassium ions and iron ions, are partially or wholly replaced with antimicrobial metal ions. Examples of antimicrobial metal ions suitable for use in the present invention include, but are not limited to, ions of silver, copper, zinc, gold, mercury, tin, lead, bismuth, cadmium, chromium and thallium. In certain embodiments, the antimicrobial metal ions comprise silver, copper or zinc ions or combinations thereof.

Optionally, other ions may also be exchanged for non-antimicrobial ions in the zeolite, including ammonium ions. It is often desirable, however, that the zeolite be substantially, or, in some cases, completely free of ions that do not have an anti-microbial effect. As used herein, the term "substantially free", when used with reference to the substantial absence in a porous solid, such as zeolite, of ions that do not have an anti-microbial effect, means that such ions are present, if at all, as an incidental impurity. In other words, the material does not affect the antimicrobial capability of the zeolite. In certain embodiments, this means that such ions are contained in the zeolite in an amount less than 0.1 percent by weight, such as no more than 0.05 percent by weight, or, in some cases, no more than 0.01 percent by weight, based on the total weight of zeolite. As used herein, the term "completely free" means that such ions are not present in the zeolite at all.

In certain embodiments, the size of the pores having an anti-microbial metal ion disposed therein is at least 2 Å, such as at least 3 Å. In certain embodiments, the size of the pores having an anti-microbial metal ion disposed therein is no more than 10 Å, such as no more than 8 Å, or, in some cases, no more than 5 Å. The size of the pores having an anti-microbial metal ion disposed therein can range between any combination of the recited values inclusive of the recited values.

In certain embodiments, the antimicrobial metal ion is present in an amount of at least 0.1 weight percent, such as at least 2 weight percent, or, in some cases, at least 3 weight percent, based on the total weight of the porous solid, such as zeolite. In certain embodiments, the antimicrobial metal ion is present in an amount of no more than 25 weight percent, such as no more than 20 weight percent, or, in some cases, no more than 10 weight percent, based on the total weight of the porous solid, such as zeolite. In these embodiments, the amount of antimicrobial metal ion in the porous solid can range between any combination of the recited values inclusive of the recited values.

In certain embodiments, the zeolite is of a type described in one or more of U.S. Pat. Nos. 4,911,898; 4,911,899, 4,938, 955, 4,938,958, 6,436,422, and United States Patent Application Publication Nos. 2005/0287353 and 2006/0156948.

Either natural zeolites or synthetic zeolites may be used to prepare the antimicrobial zeolites used in certain embodiments of the present invention. "Zeolite" is an aluminosilicate having a three dimensional skeletal structure that is represented by the formula: $XM_2/nO—Al_2O_3—YSiO_2—ZH_2O$, wherein M represents an ion-exchangeable ion, generally a monovalent or divalent metal ion; n represents the atomic valency of the (metal) ion; X and Y represent coefficients of metal oxide and silica, respectively; and Z represents the number of water of crystallization. Examples of such zeolites include A-type zeolites, X-type zeolites, Y-type zeolites, T-type zeolites, high-silica zeolites, sodalite, mordenite, analcite, clinoptilolite, chabazite and erionite.

In certain embodiments, the specific surface area of the zeolite particles is at least 150 $m^2/g$ (anhydrous zeolite as standard) and the $SiO_2/Al_2O_3$ mole ratio in the zeolite is less than 14, such as less than 11.

In certain embodiments, the antimicrobial zeolite used in the invention is type A zeolite containing ion-exchanged silver, zinc, and/or copper ions in combination with ammonium ions; such as combinations of the silver and copper ions with the ammonium ions or just silver ions and ammonium ions. A family of such zeolite antimicrobial agents is distributed by AgION Technologies, Inc. (Wakefield, Mass., USA) under AgION trademark. One grade, AW-10D, consists of 0.6% by weight of silver ion-exchanged in Type A zeolite particles having a mean average diameter of about 3μ. Another grade, AJ-10D, consists of about 2.5% by weight of silver ion-exchanged in Type A zeolite particles having a mean average diameter of about 3μ. Yet another grade, AK-80H, contains 5.0% by weight of silver ion-exchanged in Type A zeolite particles having a mean average diameter of about 2μ. Another grade, AC-10D, consists of about 3.5% by weight of silver and 6.5% by weight copper ion-exchanged in Type A zeolite particles having a mean average diameter of about 3μ. Each of the above also contain about 13-14% by weight zinc ion-exchanged ammonium.

In certain embodiments, the porous solid comprising pores having anti-microbial metal ions disposed therein is present in the coating compositions of the present invention in an amount no greater than 10 percent by weight, such as 0.1 to 5 percent by weight, or, in some cases, 1 to 5 percent by weight, based on the total weight of the coating composition. In these embodiments, the amount of the porous solid comprising pores having anti-microbial metal ions disposed therein in the coating composition can range between any combination of the recited values inclusive of the recited values.

As previously indicated, the coating compositions of the present invention also comprise a halogen counterion-containing onium compound having a minimum molecular diameter greater than the size of the pores having an anti-microbial metal ion disposed therein. As used herein, the term "onium compound" refers to a salt in which the positive ion (onium ion) is formed by the attachment of a proton to a neutral compound, examples of which include, but are not limited to, ammonium ($NH_4+$), phosphonium ($PH_4+$), sulfonium ($H_3S+$), fluoronium ($H_2F+$), chloronium, ($H_2Cl+$), bromonium ($H_2Br+$) and iodonium ($H_2I+$).

As used herein, the term "halogen counterion-containing onium compound" refers to onium compounds wherein the counterion to the onium ion comprises a halogen ion, such as a fluorine, chlorine, bromine, and/or iodine ion. In certain embodiments, the halogen counterion comprises a bromine ion.

As indicated, in the coating compositions of the present invention, the halogen counterion-containing onium compound has a minimum molecular diameter greater than the size of the pores having an anti-microbial metal ion disposed therein. In certain embodiments, the minimum molecular diameter of the halogen counterion-containing onium compound is at least 50% greater, or, in some cases, at least 100% greater, than the size of the pores having an anti-microbial metal ion disposed therein. Thus, in certain embodiments where the size of the pores having an antimicrobial metal ion disposed therein is 4 Å or less, the minimum molecular diameter of the halogen counterion-containing onium compound is at least 6 Å or, in some cases, at least 8 Å.

As will be understood by those skilled in the art, the minimum diameter of a molecule can be evaluated from the van der Waals volume of the molecule. The van der Waals volume of a molecule is the volume occupied by the molecule and may be calculated if van der Waals radii and inter-atomic distances and angles are known. Various software tools are available for performing such a calculation, including the atom volume tool implemented in Material Studio® 4.3 commercially available from Accelrys Software Inc., San Diego, Calif. From the van der Waals volume, the minimum diameter of a molecule is obtained assuming that the molecule is spherical according to the equation:

$$D=2*((0.75*V)/\pi)^{1/3}$$

where D is the minimum diameter of the molecule and V is the van der Waals volume of the molecule.

The halogen counterion-containing onium compound having a minimum molecular diameter greater than the size of the pores having an anti-microbial metal ion disposed therein is different from situations, such as those discussed above, in which an ion-exchanged onium, such as ammonium, ion is present in the zeolite itself due to partial replacement of the ion-exchangeable ions in the zeolite with the ammonium. As discussed above, such ammonium ion containing zeolites have been found inadequate for preventing discoloration of compositions into which the zeolite is incorporated. It is believed that this is because the ammonium ions also exchange with the anti-microbial ions, such as silver ions, in the zeolite, thereby depleting the zeolite of Ag+ ions and releasing them from the zeolite and into the composition where they oxidize in the presence of moisture to form the dark brown or black $Ag_2O$ which discolors the composition. In the present invention, on the other hand, but without being bound by any theory, it is believed that the molecular size of the halogen counterion-containing onium compound prevents the onium compound from ion-exchanging with the anti-microbial metal ions in the zeolite. The halogen counterions, if present in a sufficient amount (as described below), therefore remain available for ion exchange with anti-microbial ions, such as silver ions, released from the zeolite thereby preventing the formation of $Ag_2O$ in the composition. Moreover, this combination is believed to be capable of providing compositions exhibiting the controlled release on demand antimicrobial benefits desired from anti-microbial zeolite containing compositions, along with their long-term antimicrobial activity benefits, but without the discoloration drawbacks typically seen with these compositions.

The halogen counterion-containing onium compound present in the compositions of the present invention can be monomeric or polymeric, so long as it has a minimum molecular diameter greater than the size of the pores of the porous solid having an anti-microbial metal ion disposed therein.

As indicated previously, the halogen counterion-containing onium compound can be, for example, quaternary as is the case with ammonium ($NH_4+$) and phosphonium ($PH_4+$) compounds, ternary, as is the case with sulfonium ($H_3S+$) compounds, or binary, as is the case with fluoronium ($H_2F+$), chloronium, ($H_2Cl+$), bromonium ($H_2Br+$) and iodonium ($H_2I+$) compounds.

In certain embodiments, however, the halogen counterion-containing onium compound comprises a quaternary ammonium salt of the general formula $R_4N^+X^-$ wherein X represents a halogen atom, such as F, Cl, Br, or I and each R, which may be the same or different, represents a hydrocarbon, such as any saturated, unsaturated, aromatic, aliphatic, branched chain, or normal chain and may include additional functionalities and hereoatoms.

Specific examples of monomeric quaternary ammonium salts that are suitable for use in the present invention include, without limitation, tetraalkylammonium salts, trialkylarylammonium salts, dialkyldiarylammonium salts, alkyltriarylammonium salts, tetraarylammonium salts, cyclic ammonium salts and dicyclic ammonium salts.

Quaternary ammonium chlorides that are suitable for use in the present invention include, for example, dimethyl-didodecylammonium chloride, trimethyldodecylammonium chloride, dimethyldioctadecylammonium chloride, trimethyloctadecylammonium chloride, dodecyldimethyl-benzylammonium chloride, octadecyldimethylbenzylammonium chloride, trimethylcocoammonium chloride, di-methylditallowammonium chloride, trimethylsoyammonium chloride, methyldibutylbenzylammonium chloride, methyldihexylbenzylammonium chloride, methyldioctylbenzylammonium chloride, methyldihexadecylbenzylammonium chloride, methylethyldidodecylammonium chloride, methylhexadecylpyridinium chloride, trimethyldodecyloxyphenylammonium chloride, dimethyldodecylmethylallylammonium chloride, phenyldialkyloctadecylammonium chloride, dimethylchlorobenzyloctylammonium chloride, dimethylheptadecyl-α-naphthylammonium chloride, N-stearamidomethyl-N-ethoxymethyl-N-dimethylammonium chloride, N-geranyl-N-dodecylpiperidinium chloride, N—N-dimethylpyrrolidinium chloride, and methylalkylpolyoxyalkyleneammonium chloride.

Also suitable for use in the present invention are quaternary ammonium bromides, such as tetrabutylammonium bromide, tetrapentylammonium bromide, tetrahexylammonium bromide, tetraoctylammonium bromide, tetralaurylammonium bromide, tetraphenylammonium bromide, tetranaphthylammonium bromide, tetrastearylammonium bromide, lauryltrimethylammonium bromide, stearyltrimethylammonium bromide, behenyltrimethylammonium bromide, lauryltriethylammonium bromide, phenyltrimethylammonium bromide, 3-trifluoromethylphenyltrimethylammonium bromide, benzyltrimethylammonium bromide, dibenzyldimethylammonium bromide, distearyldimethylammonium bromide, tristearylmethylammonium bromide, benzyltriethylammonium bromide, hydroxyphenyltrimethylammonium bromide and N-methylpyridinium bromide.

As indicated, in certain embodiments, the halogen counterion-containing onium compound present in the compositions of the present invention is polymeric. Suitable polymers for use in certain embodiments of the present invention are currently believed to include, for example, polyurethanes, acrylics, polyethylenimines, polyphenylene ethylenes, and ring opened beta-lactams comprising terminal and/or pendant halogen counterion-containing onium salts. Exemplary polymeric halogen counterion-containing onium compounds, which are currently believed to be suitable for use in the present invention, include, without limitation, (i) the polymeric polyquaternary ammonium compounds described in International Patent Application Publication No. WO 2007/014087; (ii) the polycation polymers described in U.S. Pat. No. 7,151,139; (iii) the ternary and quaternary nitrogen containing polymers having reactive silane groups described in U.S. Patent Application Publication No. 2007/0292486; (iv) the copolymers described in U.S. Patent Application Publication No. 2006/0024264; (v) the amphiphilic additive described in U.S. Pat. No. 7,339,015; (vi) the alkylammonium polyurethanes described by Kurt et al., Highly Effective Contact Antimicrobial Surfaces via Polymer Surface Modifiers, *Langmuir* 2007, 23, 4719-4723 (2007); (vii) the ring-opened β-lactams described by Mowery et al., Mimicry of Antimicrobial Host-Defense Peptides by Random Copolymers, J. Am. Chem. Soc. 2007, 129, 15474-15476 (2007); (viii) the acrylics described by Kuroda et al., Amphiphilic Polymethacrylate Derivatives as Antimicrobial Agents, J. Am. Chem. Soc. 2005, 127, 4128-4129 (2005); (ix) the polyethylenimines described by Haldar et al., Preparation, application and testing of permanent antimicrobial and antiviral coatings, Nature Protocols, Vol. 2, No. 10 (2007); (x) the poly(4-vinyl-N-alkylpyridinium polymers described by Sambhy et al., Silver Bromide Nanoparticle/Polymer Composites: Dual Action Tunable Antimicrobial Materials, J. Am. Chem. Soc., 2006, 128, 9798-9808 (2006); (xi) the amphiphilic poly(phenyleneethynylene)s described by Ishitsuka et al., Amphiphilic Poly(phenyleneethynylene(s) Can Mimic Antimicrobial Peptide Membrane Disordering Effect by Membrane Insertion, J. Am. Chem. Soc., 2006, 128, 13123-13129 (2006); (xii) the polymethacrylates described by Ivanov et al., Characterization of Nonbiological Antimicrobial Polymers in Aqueous Solution and at Water—Lipid Interfaces from All-Atom Molecular Dynamics, J. Am. Chem. Soc., 2006, 128, 1778-1779 (2006); (xiii) the polymethacrylate derivatives described by Kuroda et al., Amphiphilic Polymethacrylate Derivatives as Antimicrobial Agents, J. Am. Chem. Soc., 2005, 127, 4128-4129 (2005); (xiv) the polyethylenimines described by Haldar et al., Polymeric coatings that inactivate both influenza virus and pathogenic bacteria, PNAS, vol. 103, no. 47, 17667-17671 (2006); and (xv) the amphiphilic arylamide polymers described by Tew et al., De Novo design of biomimetic antimicrobial polymers, PNAS, vol. 99, no. 8, 5110-5114 (2002).

In certain embodiments, however, the polymeric halogen counterion-containing onium compound present in certain embodiments of the compositions of the present invention is a polycarbodiimide comprising pendant and/or terminal onium salt groups. Indeed, it is currently believed that such polycarbodiimides are particularly useful in the compositions of the present invention because the carbodiimide groups in the polymeric backbone are susceptible to crosslinking with certain functional group containing resins of the type described earlier, such as resins comprising carboxyl, hydroxyl, phosphine, and acetylinic functional groups. In certain embodiments, the polycarbodiimide comprising pendant and/or terminal onium salt groups are used in combination with film-forming resins comprising carboxyl functional groups.

In certain embodiments, the coating compositions of the present invention comprise an onium salt group terminated polycarbodiimide having the structure (I) or (II):

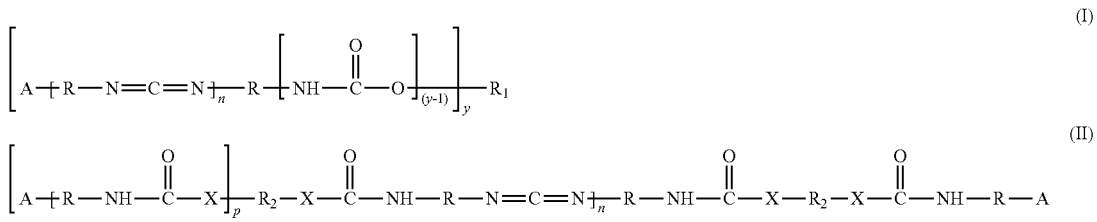

in which: (a) each R is a divalent linking group and each may be the same or different; (b) $R_1$ is A when y is 1 and is the residue of an active hydrogen-containing chain extender when y is at least 2; (c) each $R_2$ is a linking group and may be the same or different; (d) each X is O, NH or S and may be the same or different; (e) n has a value of at least 2; (f) p has a value of 1 to 3; (g) y has a value of 1 to 4; and (h) each A is represented by the structure (III):

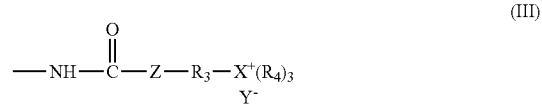

in which: (1) each X is N or P and may be the same or different; (2) each Y is a halogen and may be the same or different; (3) each Z is O, NH, or S and may be the same or different; (4) each $R_3$ is a divalent linking group and may be the same or different; and (5) each $R_4$ is a monovalent group and may be the same or different.

Such polycarbodiimides, as well as means for their production, are described in U.S. patent application Ser. No. 12/370,100, filed concurrently herewith and incorporated herein by reference.

In certain embodiments, the coating compositions of the present invention comprise a polycarbodiimide having pendant onium salt groups. These polycarbodiimides comprise a unit having the general structure (IV):

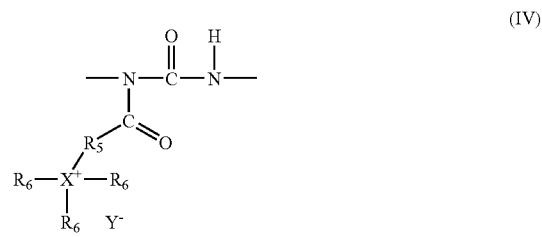

wherein: (a) X is N or P; (b) Y is an anion, such as a halogen, OH, $BF_4$, $BF_6$, $PF_6$, $AsF_6$, $CF_3SO_3$, $ClO_4$, or an anion of organic sulfonic acid; (c) $R_5$ is a divalent linking group; and (d) each $R_6$ is H or a monovalent group and may be the same or different.

In certain embodiments, these polycarbodiimides have the structure (V) or (VI):

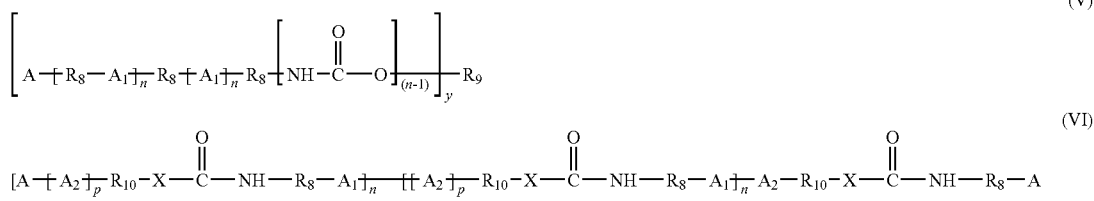

in which: (a) each $R_8$ is a divalent linking group and each may be the same or different; (b) $R_9$ is A when y is 1 and is the residue of an active hydrogen-containing chain extender when y is at least 2; (c) each $R_{10}$ is a linking group and may be the same or different; (d) each X is O, NH, or S and may be the same or different; (e) each n has a value of at least 1 and may be the same or different wherein at least one n has a value of at least 2; (f) p has a value of 1 to 3; and (g) y has a value of 1 to 4; (h) each A represents a terminal group, in some cases a reactive functional group, such as an isocyanate group; (i) each $A_1$ represents a unit having the general structure (V) or a —N═C═N— unit; and (j) each $A_2$ represents a unit having the structure (VII):

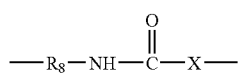

wherein $R_8$ is as defined above.

Such polycarbodiimides, as well as means for their production, are described in U.S. patent application Ser. No. 12/370,123, filed concurrently herewith and incorporated herein by reference.

As a result, the present invention is also directed to antimicrobial coating compositions that comprise: (a) a film-forming resin comprising functional groups reactive with carbodiimide groups; (b) a porous solid comprising pores having anti-microbial metal ions disposed therein; and (c) a polycarbodiimide comprising pendant and/or terminal onium salt groups.

In certain embodiments of the coating compositions of the present invention, the porous solid and halogen ion-containing onium compound are present in amounts such that the molar ratio of halogen atoms in the halogen ion-containing onium compound to metal-containing ions in the coating composition is at least 1:1, such as at least 1.1:1, or, in some cases, at least 2:1, at least 3:1, at least 4:1, or at least 5:1. In certain embodiments of the coating compositions of the present invention, the porous solid and halogen ion-containing onium compound are present in amounts such that the molar ratio of halogen atoms in the halogen ion-containing onium compound to metal-containing ions in the coating composition is no more than 20:1, such as no more than 10:1 or, in some cases, no more than 8:1, or no more than 6:1. As previously indicated, it is currently believed that when the halogen counterions are present in the composition in the foregoing amounts relative to the metal-containing ions in the composition, sufficient halogen ion are available for ion exchange with anti-microbial ions, such as silver ions, released from the zeolite thereby preventing the formation of $Ag_2O$ in the composition with the associated discoloration.

In certain embodiments, the halogen ion-containing onium compound is present in the coating compositions of the present invention in an amount greater than 0.25 percent by weight, such as at least 0.3 percent by weight, or, in some cases, at least 0.5 percent by weight, based on the total weight of the coating composition. In certain embodiments, the halogen ion-containing onium compound is present in the coating compositions of the present invention in an amount no more than 10 percent by weight, such as no more than 5 percent by weight, or, in some cases, no more than 1 percent by weight, based on the total weight of the coating composition. In these embodiments, the amount of the halogen ion-containing onium compound can range between any combination of the recited values inclusive of the recited values.

The coating compositions of the present invention can further include additives as are commonly known in the art, such as surfactants, wetting agents, and colorants, among others. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, and fillers such as calcium carbonate, barium sulfate and the like.

As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP- PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

The curable coating compositions of the invention can be prepared by any method well known to the one having an ordinary skill in the art using the above components as raw materials. A suitable method is illustrated in the Examples herein.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe mid soles. Different types of EVA foam can have different types of surface porosity. Molded EVA can comprise a dense surface or "skin", whereas flat sheets or slabs can exhibit a porous surface.

The coating compositions of the present invention can be applied to such substrates by any of a variety of methods including dipping or immersion, spraying, intermittent spraying, dipping followed by spraying, spraying followed by dipping, brushing, or roll-coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film according to the present invention, therefore, comprises applying a coating composition of the present invention to the surface of a substrate or article to be coated, coalescing the coating composition to form a substantially continuous film and then curing the thus-obtained coating. The curing of these coatings can comprise a flash at ambient or elevated temperatures followed by a thermal bake. The method of forming a coating film according to the present invention uses the above-described coating composition and, even when the baking temperature is relatively low, curing is possible. Curing can occur at ambient temperature of 20° C. to 175° C.

The coating compositions of the present invention can be applied as a primer or primer surfacer, or as a topcoat, for example, a "monocoat". The coating compositions of the invention also can be advantageously employed as a topcoat in a multi-component composite coating composition. Such a multi-component composite coating composition generally comprises a base coat deposited from a film-forming composition and a topcoat applied over the base coat, the topcoat being deposited from a coating composition of the present invention as described above. In certain embodiments, the multi-component composite coating composition is a color-plus-clear system where the basecoat is deposited from a pigmented film-forming coating composition and the topcoat is deposited from a coating composition which is substantially pigment-free, i.e., a clear coat.

The antimicrobial coatings of the present invention have a wide variety of applications. For example, the coatings can be used to coat surfaces of common objects touched by people in everyday lives, such as doorknobs, children's toys, and the like. In certain embodiments, however, the coatings are particularly desirable for use on consumer electronics devices, such as, telephones, including cell phones and smart phones, personal digital assistants, personal computers, digital cameras, or the like.

As indicated previously, a benefit of the compositions of the present invention is that they are capable of producing coatings that are resistant to discoloration. As used herein, when it is stated that a coating produced from a composition described herein is "resistant to discoloration" it means that the coating produced from a composition described herein ("coating X") exhibits UV color stability comparable to the UV color stability exhibited by a coating deposited in the same manner from an identical composition that does not include the porous solid comprising pores having anti-microbial metal ions disposed therein and halogen ion-containing onium compound having a minimum molecular diameter greater than the size of such pores ("coating Y"). As used herein, the term "comparable" means that the $\Delta E$ of coating X is no more than 50% greater than the $\Delta E$ of coating Y, in some cases no more than 25% greater than the $\Delta E$ of coating Y, or, in some cases, no more than 10% greater than the $\Delta E$ of coating Y. In some cases, the $\Delta E$ of coating X no more than the $\Delta E$ of coating Y. For purposes of the present invention $\Delta E$ values are determined by measuring the change in color intensity of a coated panel before and after exposure to ultraviolet radiation (UVA 340 nanometers, intensity of 0.83 W/m2) for 24 hours and 45° C. The change in color intensity or color shift is reported as ΔE. The larger the ΔE, the greater the color shift. For purposes of the present invention, ΔE values can be obtained by measuring the color intensity of reflected light in the visible region (380 to 780 nanometers) using a Minolta Spectrophotometer CM-3600d according to CIELAB standards.

Illustrating the invention are the following examples that are not to be considered as limiting the invention to their details. All parts and percentages in the examples, as well as throughout the specification, are by weight unless otherwise indicated.

EXAMPLE 1

A quaternary ammonium ion terminated polycarbodiimide was made using the ingredients and amounts listed in Table 1.

TABLE 1

| Raw Materials | Parts by Weight |
|---|---|
| Charge #1 | |
| Desmodur W[1] | 51.6 |
| Phospholene oxide | 0.77 |
| Charge #2 | |
| Methylisobutyl Ketone | 31.36 |
| Charge #3 | |
| Dibutyltin dilaurate | 0.0047 |
| Ethylene glycol | 2.14 |
| Charge #4 | |
| Dibutyltin dilaurate | 0.0738 |
| Choline Bromide[2] | 10.77 |
| Charge #5 | |
| Dowanol PM | 40.6 |

[1]Desmodur W is methylene-bis-(4-cyclohexyldiisocyanate) from Bayer Materials Science, LLC.
[2]Choline bromide from TCI America.

Charge #1 was added to a 1-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and Charge #2 was added. Charge #3 was added over 15 min and the reaction mixture was held at 90-100° C. until the NCO equivalent weight stalled at about 1200 eq/g. Charge #4 was added and the mixture was held at 90-100° C. until IR spectroscopy showed the absence of the characteristic NCO band. MIBK was stripped off at >100 mm Hg and was dissolved in charge #5 at 95° C. A sample of the polycarbodiimide dispersion was placed in a 120° F. hot room for 4 weeks, and the resin remained liquid.

EXAMPLE 2

A quaternary ammonium ion terminated polycarbodiimide was made using the ingredients and amounts listed in Table 2.

TABLE 2

| Raw Materials | Parts by Weight |
|---|---|
| Charge #1 | |
| Desmodur W[1] | 36.87 |
| Phospholene oxide | 0.55 |
| Charge #2 | |
| Methylisobutyl Ketone | 23.04 |
| Charge #3 | |
| Dibutyltin dilaurate | 0.0033 |
| Choline Iodide[2] | 20.69 |
| Charge #4 | |
| Dowanol PM | 46.09 |

[1]Desmodur W is methylene-bis-(4-cyclohexyldiisocyanate) from Bayer Materials Science, LLC.
[2]Choline Iodide from TCI America.

Charge #1 was added to a 1-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and dissolved in Charge #2. Charge #3 was added over 15 min and the reaction mixture was held at 90-100° C. until there is no characteristic NCO band by IR. MIBK was stripped off at >100 mm Hg and was dissolved in charge #5 at 95° C. A sample of the polycarbodiimide dispersion was placed in a 120° F. hot room for 4 weeks, and the resin remained liquid.

EXAMPLE 3

A N,N-Dimethylethanolamine terminated polycarbodiimide was made using the ingredients and amounts listed in Table 3.

TABLE 3

| Raw Materials | Parts by Weight |
|---|---|
| Charge #1 | |
| Desmodur W[1] | 51.3 |
| Phospholene oxide | 0.77 |
| Charge #2 | |
| Methylisobutyl Ketone | 31.14 |
| Charge #3 | |
| Dibutyltin dilaurate | 0.0046 |
| Ethylene glycol | 2.09 |
| Charge #4 | |
| Dibutyltin dilaurate | 0.055 |
| N,N-Dimethylethanolamine | 5.661 |
| Charge #5 | |
| Dowanol PM | 45.80 |

[1]Desmodur W is methylene-bis-(4-cyclohexyldiisocyanate) from Bayer Materials Science, LLC.

Charge #1 was added to a 3-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured ~350 eq/g by titration. The temperature was then decreased to 95° C. and Charge #2 was added. Charge #3 was added over 15 min and the reaction mixture was held at 90-100° C. until the NCO equivalent weight stalled at about 1200 eq/g. Charge #4 was added and the mixture was held at 90-100° C. until IR spectroscopy showed the absence of the characteristic NCO band. MIBK was stripped off at >100 mm Hg and was dissolved in charge #5 at 95° C. A sample of the polycarbodiimide dispersion was placed in a 120° F. hot room for 4 weeks, and the resin remained liquid.

EXAMPLE 4

A N,N-Dimethylethanolamine terminated polycarbodiimide was made using the ingredients and amounts listed in Table 4.

TABLE 4

| Raw Materials | Parts by Weight |
|---|---|
| Charge #1 | |
| Desmodur W[1] | 64.10 |
| Phospholene oxide | 0.96 |
| Charge #2 | |
| Methylisobutyl Ketone | 17.17 |
| Charge #3 | |
| Dibutyltin dilaurate | 0.0057 |
| N,N-Dimethylethanolamine | 13.73 |
| Charge #4 | |
| Methanol | 28.61 |

[1]Desmodur W is methylene-bis-(4-cyclohexyldiisocyanate) from Bayer Materials Science, LLC.

Charge #1 was added to a 1-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and dissolved in Charge #2. Charge #3 was added over 15 min and the reaction mixture was held at 90-100° C. until there is no characteristic NCO band by IR. MIBK was stripped off at >100 mm Hg and was dissolved in charge #5 at 95° C. A sample of the polycarbodiimide dispersion was placed in a 120° F. hot room for 4 weeks, and the resin remained liquid.

EXAMPLE 5

This example describes the quaternization of a N,N-Dimethylethanolamine terminated polycarbodiimide using the ingredients and amounts listed in Table 5.

TABLE 5

| Raw Materials | Parts by Weight |
|---|---|
| Charge #1 | |
| Product of Example 4 | 42.24 |
| Charge #2 | |
| Potassium Carbonate | 8.87 |

TABLE 5-continued

| Raw Materials | Parts by Weight |
|---|---|
| Charge #3 | |
| Methanol | 16.89 |
| Charge #4 | |
| Dodecylbromide[1] | 31.98 |

[1]Dodecylbromide was purchased from Sigma-Aldrich.

Charge #1 (71% solids in methanol) was added to a 500 mL, 4-necked flask equipped with a motor driven stainless steel stir blade, a water-cooled condenser, a nitrogen inlet, and a heating mantle with a thermometer connected through a temperature feedback control device. Charge #2-4 were added over 15 min and the reaction mixture was heated to 65-70° C. The resulting mixture was held at 65-70° C. until there is no Dodecylbromide by thin-layer chromatography (TLC). A sample of the polycarbodiimide dispersion was placed in a 120° F. hot room for 4 weeks, and the resin remained liquid.

EXAMPLE 6

A pendant quaternary ammonium ion containing polycarbodiimide was made using the ingredients and amounts listed in Table 6

TABLE 6

| Raw Materials | Parts by Weight |
|---|---|
| Charge #1 | |
| Product of Example 3 | 65.59 |
| Charge #2 | |
| Betaine Hydrochloride | 8.17 |
| Charge #3 | |
| Dowanol PM | 26.23 |

[1]Betaine Hydrochloride from Sigma-Aldrich.

Charge #1 (54% solids in Dowanol PM) was added to a 500-mL, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no change of NCO signal by IR. Charge #3 was added as a diluent. A sample of the polycarbodiimide dispersion was placed in a 120° F. hot room for 4 weeks, and the resin remained liquid.

EXAMPLE 7

A pendant quaternary ammonium ion polycarbodiimide was made using the ingredients and amounts listed in Table 7.

TABLE 7

| Raw Materials | Parts by Weight |
|---|---|
| Charge #1 | |
| Product of Example 4 | 64.37 |
| Charge #2 | |
| Betaine Hydrochloride | 9.88 |
| Charge #3 | |
| Dowanol PM | 25.74 |

[1]Betaine Hydrochloride from Sigma-Aldrich.

Charge #1 (53% solids in Dowanol PM) was added to a 500-mL, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no change of NCO signal by IR. Charge #3 was added as a diluent. A sample of the polycarbodiimide dispersion was placed in a 120° F. hot room for 4 weeks, and the resin remained liquid.

EXAMPLE 8

A pendant and terminal quaternary ammonium ion containing polycarbodiimide was made using the ingredients and amounts listed in Table 8.

TABLE 8

| Raw Materials | Parts by Weight |
|---|---|
| Charge #1 | |
| Product of Example 2 | 67.20 |
| Charge #2 | |
| Betaine Hydrochloride | 5.91 |
| Charge #3 | |
| Dowanol PM | 26.9 |

[1]Betaine Hydrochloride from Sigma-Aldrich.

Charge #1 (47% solids in Methanol) was added to a 250-mL, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no NCO signal by IR. Charge #3 was added as a diluent. A sample of the polycarbodiimide dispersion was placed in a 120° F. hot room for 4 weeks, and the resin remained liquid.

EXAMPLE 9

Coating compositions were prepared using the components and amounts listed in Table 9. The compositions were prepared by first adding the halogen ion containing component, if any, to the film-forming component with a stirring blade and air powered mixer. Next, the silver zeolite additive, if any, was sifted into the vortex under high speed agitation and allowed to stir for several minutes prior to blending in the reducing solvent. The crosslinker was added just prior to application of the composition to a substrate.

TABLE 9

| Component | Example 9A | Example 9B | Example 9C | Example 9D | Example 9E | Example 9F |
|---|---|---|---|---|---|---|
| VELVECRON XPC30002[1] | 64.34 | 63.26 | 63.25 | 63.25 | 63.25 | 68.12 |
| AgION AJ10D[2] | | 1.68 | 1.68 | 1.68 | 1.68 | 1.68 |
| 10% tetrahexylammonium bromide[3] | | | 9.14 | | | 2.29 |
| 10% tetramethylammonium bromide[4] | | | | 9.14 | | |
| 10% sodium bromide[5] | | | | | 9.14 | |
| VELVECRON XPS90033[6] | 21.37 | 21.01 | 11.88 | 11.88 | 11.88 | 12.79 |
| VELVECRON XPH80002[7] | 14.29 | 14.05 | 14.05 | 14.05 | 14.05 | 15.13 |
| Mole Ratio of bromide ions to silver ions | | | 4.2:1 | 6.5:1 | 9.7:1 | 0.58:1 |

| Component | Example 9G | Example 9H | Example 9I | Example 9J | Example 9K | Example 9L | Example 9M | Example 9N |
|---|---|---|---|---|---|---|---|---|
| VELVECRON XPC30002[1] | 64.28 | 63.12 | | | | | | |
| SPECTRACRON SPU 5000 MED Series MDX Conventional Solids Medical 90007 White Urethane[10] | | | 58.80 | 58.80 | 50.23 | | | |
| Spectracron SPU 5000 MED Series MDU High Solids 2.8 White Urethane Enamel[11] | | | | | | 51.65 | 51.65 | 43.62 |
| AgION AJ10D[2] | | 1.82 | | | | | | |
| GXA66584[9] | | | 31.40 | 31.40 | | 35.44 | | 35.44 |
| 10% tetrahexylammonium bromide[3] | | | | 10.00 | | | 10.04 | |
| Product of Example 8 | 1.40 | 1.36 | | | | | | |

TABLE 9-continued

| | | | | | | | |
|---|---|---|---|---|---|---|---|
| VELVECRON XPS90033[6] | 20.18 | 19.82 | | | | | |
| VELVECRON XPH80002[7] | 14.14 | 13.88 | | | | | |
| SPECTRACRON 3606[8] | | | 9.80 | 9.80 | 8.37 | 12.91 | 12.91 | 10.90 |
| Mole Ratio of bromide ions to silver ions | | | | 1.3:1 | | | 1.46:1 |

[1]Hydroxyl functional resin containing composition which is commercially available from PPG Industries, Inc., Pittsburgh, PA.
[2]Silver ion-exchanged in Type A zeolite particles having a mean average diameter of about 3μ commercially available from AgION Technologies, Inc., Wakefield, Massachusetts.
[3]10% by weight solution of tetrahexylammonium bromide in XPS90033 reducing solvent.
[4]10% by weight solution of tetramethylammonium bromide in XPS90033 reducing solvent.
[5]10% by weight solution of sodium bromide in XPS90033 reducing solvent.
[6]Reducing solvent blend commercially available from PPG Industries, Inc., Pittsburgh, PA.
[7]Isocyanate based crosslinker commercially available from PPG Industries, Inc., Pittsburgh, PA.
[8]Isocyanate based crosslinker commercially available from PPG Industries, Inc., Pittsburgh, PA.
[9]Dispersion of AW10D silver zeolite in resin and solvent commercially available from PPG Industries, Inc., Pittsburgh, PA.
[10]Hydroxyl functional resin containing composition which is commercially available from PPG Industries, Inc., Pittsburgh, PA.
[11]Hydroxyl functional resin containing composition which is commercially available from PPG Industries, Inc., Pittsburgh, PA.

The coating compositions were applied to PC/ABS plaques using a wound wire rod to produce an approximate film thickness of 1.5 mils and cured at 180° F. for 30 minutes after a 5-15 minute ambient flash. Resultant coatings were evaluated for antimicrobial efficacy and discoloration. Results are reported in Table 10. The coating composition of Example 9F was not applied because discoloration of the liquid composition occurred shortly after preparation.

TABLE 10

| Test | Example 9A | Example 9B | Example 9C | Example 9D | Example 9E | Example 9F |
|---|---|---|---|---|---|---|
| Efficacy[1] | *P. aeruginosa* 0% Kill *Listeria* 0% Kill | *P. aeruginosa* 100% kill *Listeria* 100% kill | *P. aeruginosa* 100% kill *Listeria* 100% kill | *P. aeruginosa* 100% kill *Listeria* 100% kill | *P. aeruginosa* 100% kill *Listeria* 100% kill | Not measured |
| ΔE UV[2] | 1.27 | 8.87 | 1.27 | 3.03 | 2.49 | n/a |
| ΔE Cycle[3] | 1.15 | 13.89 | 0.85 | 1.18 | 1.68 | n/a |

| Test | Example 9G | Example 9H | Example 9I | Example 9J | Example 9K | Example 9L | Example 9M | Example 9N |
|---|---|---|---|---|---|---|---|---|
| Efficacy[1] | Not measured | Not measured | Not measured | Not measured | Not measured | Not measured | Not measured | Not measured |
| ΔE UV[2] | 3.41 | 3.42 | 3.19 | 13.53 | 6.44 | 4.51 | 22.54 | 8.90 |
| ΔE Cycle[3] | 3.38 | 1.50 | 4.32 | 7.63 | 4.35 | 6.46 | 13.25 | 6.69 |

[1]A coated surface was inoculated with microorganisms for a specified time period. After exposure, the sample was washed in a buffer solution (1 mL of 0.3 mM KH$_2$PO$_4$ (pH 6.8) diluted in 800 mL of DI H$_2$O and sterilized at 250° F. or 17-21 psi for 35 minutes and cooled to room temperature) and then the solution was serially diluted. Each serial dilution was then plated onto the appropriate media and placed into an incubator for 24-48 hrs. Any viable cells propagated and produced colonies that can then be visually enumerated. The average number of surviving cells was compared to the control and % reductions were calculated.
[2]ΔE after exposure to ultraviolet radiation (340 nanometers, intensity of 0.83 W/m2) for 24 hours at 45° C. and ambient humidity. Value obtained by measuring the color intensity of reflected light in the visible region (380 to 780 nanometers) using a Minolta Spectrophotometer CM-3600d according to CIELAB standards.
[3]ΔE after exposure to ultraviolet radiation (340 nanometers, intensity of 0.83 W/m2) for 4 hours at 45° C. and 4 hours at 50° C. and 100% relative humidity. Value obtained by measuring the color intensity of reflected light in the visible region (380 to 780 nanometers) using a Minolta Spectrophotometer CM-3600d according to CIELAB standards.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (a) a film-forming resin;
   (b) a porous solid comprising an ion-exchange ceramic comprising pores having anti-microbial metal ions disposed therein; and
   (c) a halogen ion-containing onium compound having a minimum molecular diameter according to the equation:

$$D = 2 \ast ((0.75 \ast V)\pi)^{1/3}$$

where D is the minimum molecular diameter and V is the van der Waals volume of the molecule, and the minimum molecular diameter is greater than the size of the pores having anti-microbial metal ions disposed therein, wherein (b) and (c) are present in amounts such that the composition, when applied onto a substrate and cured, provides a cured coating that exhibits UV color stability comparable to the UV color stability exhibited by the same composition that does not include (b) and (c), and wherein the halogen counterion-containing onium compound is a monomeric quaternary ammonium salt having the formula:

$$R_4N^+X^-$$

where each R is a hydrocarbon and each may be the same or different, and X is a halogen atom.

2. The coating composition of claim 1, wherein (b) and (c) are present in amounts such that the molar ratio of halogen atoms to metal-containing ions in the coating composition is at least 1:1.

3. The coating composition of claim 1, wherein (b) and (c) are present in amounts such that the molar ratio of halogen atoms to metal-containing ions in the coating composition is at least 2:1.

4. The coating composition of claim 1, wherein the porous solid comprises zeolite.

5. The coating composition of claim 1, wherein the anti-microbial metal ions comprise silver ions.

6. The coating composition of claim 1, wherein the halogen ion-containing onium compound has a minimum molecular diameter at least 50% greater than the size of the pores having anti-microbial metal ions disposed therein.

7. The coating composition of claim 1, wherein the halogen counterion-containing onium compound comprises a bromine ion.

8. The coating composition of claim 1, wherein the quaternary ammonium salt comprises a quaternary ammonium bromide.

9. The coating composition of claim 8, wherein the quaternary ammonium bromide comprises tetrahexylammonium bromide.

10. The coating composition of claim 1, wherein the porous solid comprises zeolite free of ions that do not have an anti-microbial effect and the anti-microbial metal ions consist of silver ions, and wherein R is a saturated aliphatic hydrocarbon where the minimum molecular diameter is at least 100% greater than the size of the pores having anti-microbial metal ions disposed therein.

11. The coating composition of claim 1, wherein the minimum molecular diameter is from 4 Å to 20 Å and the size of the pores having anti-microbial metal ions disposed therein is no more than 10 Å.

* * * * *